(12) United States Patent
Schlunke

(10) Patent No.: US 8,181,902 B2
(45) Date of Patent: May 22, 2012

(54) AERODYNAMIC LIFTING DEVICE AND AIRBORNE CRAFT

(75) Inventor: Christopher Kim Schlunke, City Beach (AU)

(73) Assignee: Entecho Pty Ltd., Western Australia (AU)

( * ) Notice: Subject to any disclaimer, the term of this patent is extended or adjusted under 35 U.S.C. 154(b) by 1010 days.

(21) Appl. No.: 12/047,201

(22) Filed: Mar. 12, 2008

(65) Prior Publication Data

US 2008/0223979 A1  Sep. 18, 2008

Related U.S. Application Data

(63) Continuation-in-part of application No. 11/377,098, filed on Mar. 15, 2006, now Pat. No. 7,556,218, and a continuation-in-part of application No. PCT/AU2007/001718, filed on Nov. 9, 2007.

(30) Foreign Application Priority Data

Mar. 15, 2005 (AU) .............................. 2005901244
Mar. 15, 2005 (AU) .............................. 2005901245

(51) Int. Cl.
*B64C 29/00* (2006.01)

(52) U.S. Cl. ................... 244/12.2; 244/23 C; 244/73 C

(58) Field of Classification Search .................. 244/3 C, 244/34 A, 7 B, 21, 23 D, 12.5, 73 B, 73 C, 244/12.1, 23 R; 180/117, 127, 128; 415/188, 415/186, 208.3, 208.4
See application file for complete search history.

(56) References Cited

U.S. PATENT DOCUMENTS

| | | |
|---|---|---|
| 2,876,965 A | 3/1959 | Streib |
| 3,067,967 A | 12/1962 | Barr |
| 3,103,325 A | 9/1963 | Leutzinger |
| 3,107,071 A | 10/1963 | Wessels |

(Continued)

FOREIGN PATENT DOCUMENTS

FR  2729917  8/1996

(Continued)

OTHER PUBLICATIONS

Official Action for U.S. Appl. No. 11/37,098, mailed Dec. 28, 2006.

(Continued)

*Primary Examiner* — Joshua J Michener
(74) *Attorney, Agent, or Firm* — Sheridan Ross P.C.

(57) ABSTRACT

An airborne craft is provided comprising an aerodynamic lifting device having a radial drum fan and a thrust vectoring shroud. The radial drum or vertical axis fan comprises a fan with a rotor, the rotor having a rotational axis and comprising a plurality of rotor blades disposed in an annular ring about the rotational axis and a driving means for the rotor such that, on operation of the driving means, lift is generated.

31 Claims, 12 Drawing Sheets

U.S. PATENT DOCUMENTS

| | | | |
|---|---|---|---|
| 3,465,989 A | 9/1969 | Bowshier |
| 3,507,461 A | 4/1970 | Rosta |
| 3,519,224 A | 7/1970 | Boyd et al. |
| 3,632,065 A | 1/1972 | Rosta |
| 3,838,835 A | 10/1974 | Kling |
| 4,208,025 A | 6/1980 | Jefferson |
| 5,524,827 A | 6/1996 | Znamensky et al. |
| 5,653,404 A | 8/1997 | Ploshkin |
| 6,113,029 A | 9/2000 | Salinas |
| 6,189,332 B1 | 2/2001 | Ota et al. |
| 6,352,219 B1 | 3/2002 | Zelic |
| 6,368,062 B1 | 4/2002 | Yagami et al. |
| 6,616,094 B2 | 9/2003 | Illingworth |
| 6,669,138 B1 | 12/2003 | Arrieta |
| 6,802,693 B2 | 10/2004 | Reinfeld et al. |
| 6,843,699 B2 | 1/2005 | Davis |
| 2006/0214052 A1 | 3/2006 | Schlunke |

FOREIGN PATENT DOCUMENTS

| | | |
|---|---|---|
| GB | 00881785 | 9/1961 |
| GB | 0958842 | 5/1964 |
| GB | 1361036 | 7/1974 |
| GB | 2360752 | 10/2001 |

OTHER PUBLICATIONS

Official Action for U.S. Appl. No. 11/37,098, mailed Sep. 24, 2007.
Official Action for U.S. Appl. No. 11/37,098, mailed Mar. 19, 2008.
Official Action for U.S. Appl. No. 11/37,098, mailed Apr. 30, 2008.
Official Action for U.S. Appl. No. 11/37,098, mailed Nov. 28, 2008.

Fig. 7a Accelerating
Fig. 7b Cornering
Fig. 7c Braking

AERODYNAMIC LIFTING DEVICE AND AIRBORNE CRAFT

This application is a Continuation-In-Part of pending U.S. patent application Ser. No. 11/377,098, filed Mar. 15, 2006, which claims the benefit of Australian Patent Application Nos. 2005901244, 2005901245 and 2005901246, each filed Mar. 15, 2005, and a Continuation-In-Part of pending PCT application Serial No. PCT/AU2007/001718, filed Nov. 9, 2007, the entire disclosures of which are incorporated by reference herein.

FIELD OF THE INVENTION

This invention relates to aerodynamic lifting devices for airborne craft.

BACKGROUND/SUMMARY OF THE INVENTION

Powered airborne craft, manned and unmanned, may be capable of hovering in a stationary position while airborne. Such aircraft may range from craft which operate close to the ground relying on a cushion of air to those capable of free flight and vertical takeoff and landing. Craft operating close to the ground may be designed for transportation and recreational use whereas the free flight craft may operate at generally low altitudes compared to commercial aircraft and may be considered for applications including airport-to-downtown shuttle, home-to-office commuting, search and rescue and surveillance operations.

The most common craft that hovers close to the ground is the hovercraft which is generally a craft used for recreational and general transport and ferry duties. This craft has a number of disadvantages that have limited its penetration of markets for motorized recreational products and general transportation of personnel and goods.

One important limitation of such craft is the inability to operate over terrain with obstacles of significant size such as waves, boulders, riverbanks and the like because close contact must be made with the ground to avoid the leakage of the air cushion. Any increase in the operating height of the hovercraft is accompanied by an unrealistic horsepower requirement. A further notable limitation is the inability to develop significant lateral thrust for acceleration, braking, climbing gradients and changing direction with realistic horsepower requirements despite the use of separate fans for developing this lateral thrust. In general, the "footprint" of the hovercraft is acceptably small for its lifting capacity because the entire area under the craft and an appropriate peripheral skirt encapsulates an air cushion which can operate at sufficient pressure with low power requirements provided that the clearance between the grounds and the skirt is small so as to minimize air leakage. In effect the air cushion of a hovercraft provides a low friction sliding surface over which the hovercraft may move.

The most common and widely employed free flying vertical takeoff and landing (VTOL) craft that operates at higher altitudes is the helicopter. The success of this vehicle is due to the urgent need for this VTOL capability and the ability to achieve hovering flight with acceptable power consumption because of the very large amount of air that is contacted by the large diameter lightweight blade structure. The main undesirable characteristic of helicopters is the long rotating blades, which are a hazard to personnel and to the aircraft itself should they strike anything in the area and the very large footprint or minimum safe space requirements that these aircraft require, particularly during takeoff and landing.

Further undesirable characteristics include the requirement for a remotely mounted propeller to counteract torque reaction of the airframe to the drive of the main rotor, complicated and relatively fragile rotor blade attack-angle controls, high maintenance requirements and rotor blades which must be long, thin, and relatively light and thus are flexible and subject to fatigue problems. Add to this incomplete list of limitations the fact that failure of any one of these components is likely to have catastrophic consequences for the aircraft and all on board and it is evident that an alternative design is desirable.

In a craft free of ground effect, lift can be generated by the acceleration of a mass of air by a fan, propeller, wing, or other system. When a mass of air is changed from rest to a given velocity in a downward direction, an upwardly directed reaction force is produced. In general, the more air that is directed, the less power is required to produce a given lift. This defines the technical challenge which this invention attempts to address because increasing the volume of air generally involves an increase in the size of the craft as evidenced in the large diameter, high speed blades used in helicopters.

The rotor blades of a helicopter develop lift by accelerating air downward and parallel to the axis of its rotation (axially). The velocity of the tip of the rotor blade is typically set to a maximum that is close to sonic (Mach 1) conditions (being approximately 1250 km/hr (ie approximately 350 m/s) at sea level and normal temperatures) on the advancing blade when the helicopter is at maximum forward speed (typically helicopters are limited to forward speeds of about 320 km/hr, and blade tip speeds relative to the helicopter itself are of the order of 900 km/hr i.e. 250 m/s). The remainder of the blade must operate at a lower velocity proportional to its distance from the axis of the rotor. Unfortunately this non-uniform velocity along the blade means that significant blade length is underutilized despite varying the angle of attack and changing the aerodynamic profile along the length of the rotor blade because lift is proportional to the velocity squared. To compound the problems of the rotor, because the highest lift is generated at the highest velocity region, at the tip a very high bending moments is generated on this cantilevered structure. Further, to get the maximum lift from the rotor, the blade tip must operate at the highest permissible velocity close to sonic conditions, which means that considerable noise is generated. Correspondingly the rotor diameter cannot be reduced because to generate the same lift, the velocity would have to increase beyond sonic conditions or some part of the operating envelope would have to be compromised.

Further, and within the class of airborne hovering craft capable of free flight, it would be a desirable object to achieve an increase in payload or lift at the same or reduced power in order to improve fuel efficiency and operating cost.

It is a further object of this invention to provide an aerodynamic lifting device for airborne craft such that such craft deliver performance characteristics superior to helicopters by generating superior lift capability and/or a reduced horsepower requirement from a lifting device with a smaller footprint.

It is a still further object of this invention that the fan geometry and power train used to achieve operation provide a convenient, stable and safe load space for manned and unmanned operation.

With these object in view, the present invention provides, in one aspect, an aerodynamic lifting device having a thrust axis and comprising an airflow generating means and a thrust vectoring means having an outlet region wherein the airflow from the airflow generating means provides airflow in a direction orthogonal to the thrust axis and such airflow acts on an inner side of the thrust vectoring means and emanates from the outlet region in the direction of the thrust axis and wherein the device has an operating region intermediate the power loading ("y") asymptotic region and the disc loading ("x") asymptotic region of a power loading—disc loading characteristic for the lifting device. The airflow may act only on the inner side of the thrust vectoring means in one embodiment of the present invention.

In another aspect of the invention there is provided, an aerodynamic lifting device comprising a fan with a rotor, the rotor having a rotational axis and a plurality of rotor blades disposed in an annular ring about the rotational axis, said blades extending substantially parallel to the rotational axis of the rotor; and a driving means for the rotor such that, on operation of the driving means lift is generated; wherein the lifting device further comprises a thrust vectoring means for re-directing airflow from the fan in a direction substantially parallel to the rotational axis of the fan. The fan generates a predominately radial airflow, such radial airflow being acted upon by the thrust vectoring means, for example an outer duct or shroud located radially outward from the fan rotational axis, so as to re-direct the airflow to in a direction substantially parallel to the rotational axis of the rotor so that a lifting force (ie thrust) is generated. Such an aerodynamic lifting device may be used in airborne craft, particularly hovering craft, whether manned or unmanned.

For ease of reference, the rotational axis of the rotor will be considered to be vertical although it is to be understood that this is not a limitation of the inventive concepts described herein.

Preferably, the blades have a longitudinal extent substantially parallel to the rotor axis and the flow through them is primarily radial or perpendicular to the rotor axis. In this way substantially the entire length of the blade is operating at a similar velocity and generating the maximum amount of momentum in the air for minimum blade mass and minimum vehicle overall size. By avoiding the radially disposed blades (such as helicopter type blades), the optimum blade velocity and blade geometry can be utilized, and the size, cost and weight of the structure can be minimized. Further, the blades can be restrained at each end (i.e. at the upper and lower blade extents) by respective retaining rings—for example circular ring restraining endplates—that minimize the bending moment on the blade generated by the aerodynamic loads. This allows for a lighter blade structure, lighter vehicle structure and ultimately for the reasons noted above a reduced vehicle size.

Preferably, the retaining rings or circular ring restraining endplates form a diffuser duct across the blades, wherein respective facing surfaces of the retaining rings converge towards the radially outer side of the retaining rings. The longitudinal extent of a blade is larger at a radially inner end than at the radially outer end. This conveniently "wedges" the blades between the end plates when a centrifugal loading is applied to the blade due to its rotation about the rotor axis.

Conveniently, the flow area at the inner side of the rotor is approximately the same as the flow area at the outer side of the rotor. The convergence of the retaining rings reduces the height of the flow area of the outer side of the rotor, and since this area is at a greater radius then the inner side of the rotor, the actual flow area's can be maintained approximately equal. It is believed that this arrangement provides an increased efficiency in the generation of a lifting thrust.

Conveniently, the rotor may be supported for rotation by bearings disposed either side of, and bearing against, the upper and/or lower retaining rings. The rotor may be driven by a drive ring located on the periphery of the rotor.

Such a design allows achievement of a design envelope for airborne aircraft, specifically hovering aircraft, that—when considered according to a power loading—disc loading characteristic as commonly used in the field of helicopter design—is constrained on one axis by lift horsepower characteristics that are similar or slightly superior to helicopters and on another axis by disc loading or weight/unit area of the vehicle footprint that is on the order of 2 to 3 times larger than typical helicopters and while advantageously using the radial fan or aerodynamic lifting device of the present invention. Such a lifting power—disc loading characteristic mathematically asymptotes to infinite power loading at low disc loading (y—asymptote and defining a y asymptotic region where helicopters currently operate) and infinite disc loading at low power loading (x asymptote and defining an x asymptotic region) though there are practical constraints on power loadings and disc loadings achievable in practice. The aerodynamic lifting device of the invention allows operation of a hovering craft in a region which may be described as an intermediate region (between the x and y asymptotic regions) of a momentum characteristic for an open fan lifting device or on or above the momentum equation in contrast to current airborne craft, notably helicopters.

The fan may be described as a drum rotor or radial drum fan which may be defined as a fan with the blades advantageously occupying an annular region having a radial depth that is less than 25% of the radial pitch of the blades. By placing the rotor blades at a distance from the rotation axis of the fan, a central region within the rotor is conveniently provided for a payload, or in the case of a larger sized craft, a pilot and/or passengers.

Upper and lower retaining rings may be provided for the rotor blades so as to form a diffuser duct, air flowing through the diffuser duct generating a lifting force on a lifting face of the thrust vectoring means. Preferably, the air flow though the fan is managed in such a way that air enters the rotor at the radially innermost side, is acted upon by the rotor blades, is discharged at the radially outermost side of the rotor and is then re-directed in a generally axial (ie downward) direction by an outer shroud.

Preferably, the rotor may be driven by a hub-less drive using a friction drive, drive belt, gear or other drive, wherein the fan is supported and guided for rotational motion at its periphery. One or more drive belt(s) may co-operate with a drive ring located on the periphery of the rotor to drive the rotor. A hub-less drive arrangement provides the benefit of better packaging of the load/passenger space in the centre of the fan (i.e. there is no need for a central shaft to occupy this area) and also avoids the issue associated with out of balance rotational forces of a central drive shaft mounted drum rotor fan.

Use of a rotor as described above for an aerodynamic lifting device dictates that the mass of the rotor and associated drive means is kept to a minimum. In addition, to ensure dynamic responsiveness of the device (that is an ability to increase airflow being pumped by the rotor and/or the ability of the device to alter its spatial attitude), the mass and polar moment of inertia of the rotor should be kept to minimum. Although this does not necessarily preclude designs wherein a portion of the rotor forms an active component of an electric motor, it is likely to at least cause an unacceptable increase to the polar moment of inertia of the rotor and thus increase the gyroscopic forces created during attitude changes of the device.

Preferably the rotor comprises a peripherally disposed drive surface, wherein a drive belt frictionally engages said surface to provide drive to the rotor.

Preferably the interaction of the drive surface and drive belt produces an net force in the axial direction of the rotor. By providing a net axial force on the rotor, the stability of the rotor can be improved as one set of bearing to bear against the rotor can be used, and the other end of the rotor may be provided with a clearance space without the need for a bearing surface.

The use of a hub-less drive arrangement for a drum rotor fan may be of particular benefit for fans used in ventilation or air-conditioning applications as a result of the packaging arrangement (which may allow for a particularly compact axial length of the fan/drive assembly which may be useful in certain applications) and/or the rotational balance benefits arising from the lack of a central drive shaft mounted fan, as discussed above.

Preferably, the device includes a stator that has blades that are upstream and/or downstream of the rotor blades. Reference to "stator" and "stator blades" will be understood to be a reference to stationary components of the device relative to the rotating fan. The use of inlet stator blades provides the ability to pre-swirl the air so that it is presented at an optimum angle of attack to the rotor blades.

Preferably, the stator produces a torque in the opposite direction to the torque on the rotor—that is, a counter-torque. Advantageously, the counter-torque produced by the stator is approximately equal in magnitude to the torque on the rotor.

Preferably, at least some of the stator blades are inlet stator blades located upstream, that is at the radially inner side, of the rotor blades.

Preferably such inlet stator blades are proximate the rotor.

Preferably such inlet stator blades are disposed within an annular region whose radial extent is small compared to its radial pitch dimension. By constraining the stator blades to be within a small annular dimension as compared to the radial pitch dimension, the central region within the stator blades provides a centralized region which may be used for a payload, or for larger sized craft, a pilot and or passengers.

Conveniently, the inlet stator blades can be designed and spaced apart so as to give some protection to the rotor blades from ingress of foreign materials, and/or prevent an operators limbs coming into contact with the rotor blades.

Preferably, the inner stator blades include portions which are disposed above the height of the rotor blades and such portions are contoured so as to provide approximately the same degree of circumferential acceleration to the airflow at the inlet to the upper region of the rotor blades as that provided by the portion of the stator blades which are disposed below the upper region of the rotor blades and which feed air into the lower portions of the rotor. Advantageously, this can be achieved by the use of a "twister" portion at the upper end of the stator blade. This feature is particularly beneficial for airflow which emanates from a region at a radius outside of the radius of the inlet of the rotor blades and above the top of the rotor blades as this air does not traverse the same radial extent of the inlet stator blade and is therefore not provided with the same degree of circumferential acceleration as air which enters the stator blades at their lower extent and therefore traverses the complete radial extent of the stator blade.

Preferably, the twister portion of the inlet stator blades comprises an upper portion which is displaced circumferentially (ie tangentially) at its radially outer extent relative to a portion of the blade below said upper portion.

Preferably the stator comprises outer stator blades. Conveniently, these outer stator blades may provide or assist in providing a counter-torque to the rotor.

Preferably at least some of said outer stator blades are movable. Conveniently, actuating some or all of the outer stator blades provides a degree of yaw control (ie rotation of the stator about the axis of the rotor).

The fan has an input airflow side. Wings to generate lift may be mounted on the input airflow side. For example, upper face(s) of the inner and outer hub or stator of the fan which are disposed near the inlet or low pressure side of the fan may be contoured to function as wings and produce significant lift by developing high velocities and lower pressures near these surfaces. The reference to "the inner and outer hub or stator" is a reference to that part of the stator which is radially inward of the fan and radially outward of the fan respectively. An annular airfoil or airfoils ("wing(s)") may be deployed as a device to improve lift while the craft is hovering while also functioning as a flow deflector to improve the radial flow into the stator and fan assembly. Desirably the annular airfoil(s) or wings can also function as a restraint, for example a restraining ring for the stator blades, more particularly the inlet stator blades.

Preferably, the input airflow side may include an upper inlet duct comprising one or more annular wings or guide vanes. Such upper inlet duct may be at least partially defined by a lip which is disposed around the most radially inward upstream circumference of the fan or rotor of the drum rotor fan. Advantageously, said lip forms part of the annular airfoil which provides an upper restraint for restraining an upper portion of the stator blades. Further, advantageously at least part of said wings or guide vanes are disposed in an inlet region containing radially directed airflow. Stator blades located in the upper inlet duct may be contoured to provide approximately the same degree of circumferential acceleration to the airflow at the inlet to the rotor blades as that provided by the stator blades which are disposed below the upper inlet duct.

Alternatively, or in addition to the inlet duct, an outlet duct comprising one or more annular wings or guide vanes is provided. Such outlet duct may be at least partially defined by a lip which is disposed around the most radially outward, downstream circumference of the fan or rotor of the drum rotor fan. Advantageously, the wings or guide vanes are disposed in an outlet region containing radially directed airflow.

In either case of an inlet duct or an outlet duct, the corresponding lip may be contoured to develop lift.

Preferably, in the case of an inlet duct, the lip extends over and radially beyond the inner edge of the rotor blades. In this way, that airflow induced into the rotor from a region radially outward from the inner edge of the rotor blades will travel radially inwardly over the lip (thereby generating lift) before passing (through the twister portion of the inlet stator blades and) into the rotor fan. The corresponding lip for the inlet duct may have wings to generate lift disposed about it, both upstream and downstream and radially inward of the lip.

Alternatively, and somewhat counter intuitively, even when design constraints dictate that such wings will develop negative lift, they are still to be advantageously applied in order to provide guidance of the air around the lip to enhance the performance of said fan or enhance the overall lifting performance of the device.

The wings may form an aerodynamic slot by being spatially disposed to each other and/or the associated lip.

The aerodynamic slots would desirably be configured to accelerate the boundary layer over said wings and prevent or delay separation of the air stream from the lifting surfaces.

Preferably, said aerodynamic slots are greater than one/one hundredth of the chord of said wings and less than one/tenth of the chord of said wings.

Preferably the radial air flow produced by the rotor is desirably converted to pressure in a suitably shaped duct formed beneath an outer hub thereby maximizing the lift generated by the process. The increase in pressure which occurs through the blades of the fan as a result of the acceleration of the airflow by the blades can be optimized by the design of the radial duct that exists downstream of the fan. It is an aspect of this invention that this duct directs the flow downward and optimizes the pressure field developed downstream of the fan to generate the maximum lift.

The change in area of this duct in the direction of the airflow increases by no more than 1.5 times from the duct inlet to exit and decreases by no less than 0.5 times from inlet to exit. It is also an aspect of this invention that the mean flow path length of this radial annular flow path can vary from the minimum possible length that deflects the air through 70 degrees to 110 degrees up to 3 times this length.

Preferably the aerodynamic lifting device comprises a thrust vectoring means for providing directional control of the device when airborne.

Preferably the thrust vectoring device also acts as a duct for re-directing the air exiting the rotor. The thrust vectoring device or duct may comprise a flexible portion, movement of the flexible portion resulting in thrust vectoring. The thrust vectoring means, or shroud may also be of varying flexibility.

In this form the shroud may conveniently (and interchangeably) be referred to as skirt. However, this is to be contrasted to the skirt of a conventional hovercraft which simply maintains a close contact with the ground rather than providing a means to deflect the airflow to provide thrust and directional control of the craft.

Conveniently, the duct, shroud or skirt may have orthotropic characteristics in that it is relatively stiff in one or more direction(s) of stress and relatively flexible in the other direction(s). For example, the shroud may be predominately, or at least in part, constructed of a flexible sheet or fabric material (for example, rip-stop nylon—as often used for hot-air balloons, kites or parachutes) which is relatively stiff in the plane of the material, but which is flexible in the direction orthogonal to this plane.

An actuation means may be used to move all or part of the shroud relative to the stator assembly. Preferably, operation of the shroud—for example by movement of all or part of the shroud (particularly at least part of a flexible portion of the shroud)—results in a change in the position of the centre of action of the lifting forces when projected in a plane perpendicular to the thrust axis. Alternatively, or in addition, movement of all or part of the shroud results in a change in direction of the resultant thrust vector acting on the device. Movement of the centre of action of the lifting forces results in a tilting of the craft about its centre of gravity. The tilting action results in the thrust vector changing direction and propelling the device in the direction of the tilt.

Preferably the shroud may comprise different types of orthotropic materials so as to allow the shroud to deform into shapes that allow thrust vectoring to occur whilst maintaining an efficient shape for the re-direction of the air flow downward from the rotor.

Conveniently the aerodynamic lifting device may be in the form of a airborne lifting device.

Using a radial drum or drum rotor fan as means to generate thrust for an airborne lifting device places high demands on the rotor blades.

Advantageously, the fan blades have aerodynamic profiles. The fan blades may be contoured so that the aerodynamic lifting forces acting on the blades are approximately opposite in magnitude. and direction to the centrifugal forces acting on said blades in use. Advantageously, the aerodynamic loading on a blade of the rotor is in opposite direction to the centrifugal loading on the blade. The blades may take the form of known aerodynamic wing profiles such as the NACA series of profiles. The blades may be contoured by varying at least one of the group consisting of chord length, blade thickness, radial position, camber and camber position. Such contouring provides advantages including fan efficiency, noise, the ability to operate satisfactorily with differing inlet air velocities and different angles of attack, and reduced mass of the blades construction for a given working duty.

The geometry of such blades may include (but is not limited to) a forward facing (concave face towards the direction of rotation) with the blade including a leading edge (relative to the direction of rotation) forward of the trailing edge. Blade thickness may reach a maximum between the leading edge and the trailing edge. Trailing edge thickness is less than leading edge thickness.

Conveniently, the blades are of a constant cross-section.

Preferably, such blades are of composite or metallic material. Blades may be manufactured by an extrusion process as commonly used in the aluminium or plastics industry.

Alternatively, the blades may be manufactured by wire cutting a foam blank which may then be coated by tape and/or fibre and resin for reinforcing and protection of the blank shape.

A further means of producing lift when close to the ground, effective in takeoff and landing, is "Ground Effect." This is roughly equivalent to creating a zone of very slight compression in the air between the vehicle and the ground and using that pressure applied to the lower projected area of the vehicle to help support said vehicle. This effect becomes stronger as the ground is approached and becomes negligible as the vehicle lifts away from the ground. It is an aspect of this invention that this ground effect is also utilized in combination with the other lifting aspects by deploying said flexible flow deflecting duct at a distance which is sufficiently close to the ground to generate significant additional lift when it may be required for take-off or very high payloads. In this case the flexible flow deflecting duct effectively acts in a similar capacity as the skirt of a hovercraft.

In a further embodiment of this invention, there is provided an airborne lifting device comprising:

a fan having a vertical fan axis with a plurality of blades whose axes are also vertical or near vertical disposed at a distance from said fan axis, having a chord and/or radial depth which is small relative to said distance and generating primarily radial airflow;

a stator assembly that comprises an inner load carrying hub and lifting surfaces, stator blades that are radially inward of and parallel to said fan blades; and a thrust vectoring means for directional control of the device.

The thrust vectoring means may be an outer shroud that incorporates upper and lower aerodynamic lifting surfaces. The shroud acts as a thrust vector which enables a variety of maneuvers for an airborne craft employing the airborne lifting device.

Stator blades may be provided radially inward of the fan blades and disposed at a distance about the fan axis. The radial extent of the stator blades may be small relative to the distance of the blades from the fan axis.

Preferably, the fan comprises vertical or near vertical blades which may have uniform section, may include an upper retaining ring for said blades and a lower retaining ring, said rings forming a diffuser duct in conjunction with said shroud for the purposes of generating the maximum pressure over the largest horizontally projected area of the lower lifting face of the shroud for generating a lifting force. The shroud may be flexible or be of varying flexibility in selected directions or regions and may be constrained at its inner and/or outer periphery. Shroud constraints may be moved by an operator or controller as a thrust vector to effect directional control of a craft employing the lifting device. In this way, other means to achieve directional control may be omitted.

The fan may be driven via said lower retaining ring using a friction drive, belt, gear or other drive, such drive being provided by a source of power disposed near the said retaining ring or radially further inboard toward the center of said load carrying hub.

The stator may be mounted inboard of the rotor and so as to provide a support for the payload. Aerodynamic device(s) or surfaces providing lift may be mounted on the input airflow side of the rotor and may form part of a retaining ring which supports the blades of the stator. An inner hub of the stator may incorporate an upper payload carrying and lifting surface and may have a load space beneath it. Radial dimensions of said inner hub, stator blades, fan blades and outer shroud are advantageously minimized to generate the smallest possible footprint while still creating sufficient lifting surface area and sufficient airflow at a low enough pressure to minimize the power required for lift.

In contrast to the practice of using axial flow fans (as in helicopters) for generating lift, there is provided a radial flow fan lifting device in which blades of limited radial dimensions are adopted to create a static load carrying space in the center of the craft such that craft overall dimensions are minimized for a given lifting capacity. Further, the rotor blades are thereby positioned in a fixed radial location so that the total length of all the blades in the rotor assembly operate at a similar and optimized velocity to accelerate the largest amount of air over suitably disposed adjacent lifting surfaces thereby minimizing the horsepower required to generate lift within a small vehicle envelope. Further, the fan geometry provides operation of airborne craft with competitive lift/power performance with a much reduced footprint or weight/area ratio when compared to current craft. At the same time, the fan geometry provides a convenient central stable safe load space for manned and unmanned operation.

In another aspect of the present invention, there is provided an airborne craft having a drum rotor fan for generating lift for the device which has an operating region intermediate the power loading ("y") asymptotic region and the disc loading ("x") asymptotic region of a power loading—disc loading characteristic for the lift generating device.

A manned airborne craft having the above described lifting device preferably comprises an operator area for housing an operator and operator controls for maneuvering the airborne craft. The operator area may be disposed such that, in operation, the center of gravity of the operator is at or below the upper most extremity of the rotor blades and further located such that the operator has a clear line of sight horizontally across the top of the fan.

This positioning of the operator provides a number of benefits. The center of gravity of the craft is at least 0.3 times the craft diameter, and below the intersection of the line of action of the lifting forces when the craft is tilted at an angle of 45 degrees. Firstly, the operator is located in a safe position within the craft structure because the significant energy must be expended in the event of an impact by deforming the shroud rotor, stator and inner hub before there is any intrusion into the operator's cockpit.

The driving means for the rotor is desirably such that the inside of said rotor is not occupied by rotating components that would intrude into the free load space thereby made available. The driving means may include a friction or belt drive, a gear drive, a chain drive or an inductive or magnetic drive. A belt drive may incorporate a belt which has teeth on the outer side which engage in a driving pulley mounted on an engine or motor, an idler pulley that changes the direction of the belt so as to create sufficient wrap angle on said driving pulley, and a flat side on said belt that drives an outer rim of an annular flange that is connected to said rotor blades.

For a craft capable of carrying a human operator, a rotor diameter of approximate two (2.0) meters may be employed. The rotor blade tip operating speed may be advantageously set to a maximum of below 0.3 Mach (ie less than 100 m/s). In an experimental model being developed by the applicant (having a rotor diameter of approximately 1.8 m and having 24 blades of approximately 340 mm length) the maximum blade tip operating speed has been set to approximately 0.15 Mach (ie approximately 50 m/s) with good results. This enables a comparatively low disc loading which enables a better power loading. This blade tip speed can be compared to a typical helicopter blade tip speed which is discussed earlier in this specification.

In a still further aspect of the invention, there is provided a drum rotor fan for generating a fluid flow wherein the blades of the rotor are parallel to the axis of rotation of the fan, are of constant cross-section along the length of the blades, and wherein the blades have an aerodynamic profile comprising a leading edge, an increasing blade thickness reaching a maximum between the leading edge and a trailing edge, and a trailing edge thickness which is less than the leading edge thickness and wherein, in use, the aerodynamic loading on a blade of the rotor is in opposite direction to the centrifugal loading. The drum rotor fan may include one or more of the specific advantageous features described above and may be used as part of a ventilation or air-conditioning system.

A particular advantage of the aerodynamic lifting device and airborne craft of the present invention is the lesser noise compared to helicopters and other similar craft.

BRIEF DESCRIPTION OF THE DRAWINGS

The invention may be more fully understood from the following description of preferred embodiments thereof made with reference to the accompanying drawings in which.

DETAILED DESCRIPTION

Figure 1:
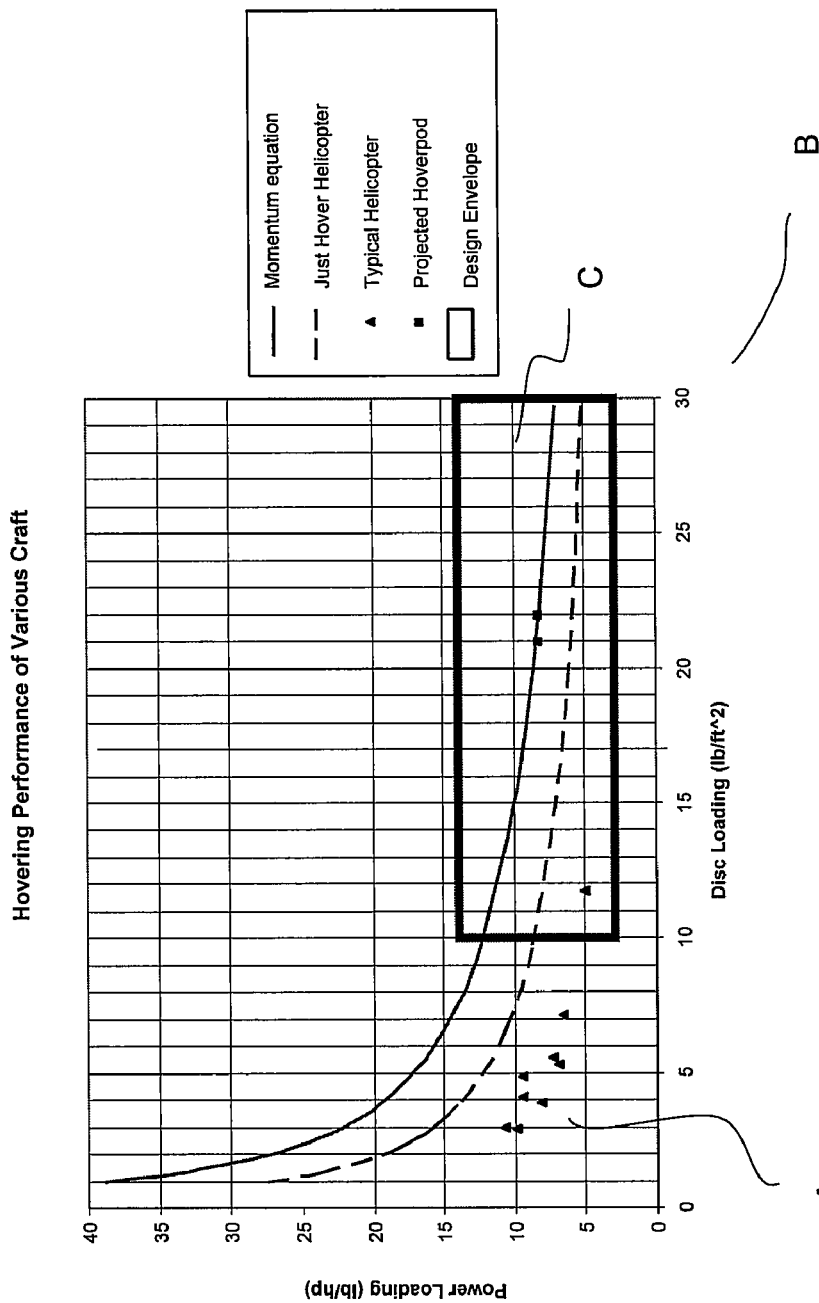
FIG. 1 is a graph of power loading vs. disc loading which indicates the calculated lift performance and power requirements of a range of helicopters and an aerodynamic lifting device according to the invention. A curve, which indicates the performance indicated by the momentum equation, is also shown along with a similar curve that predicts the performance of a helicopter that is just capable of hovering with no additional horsepower available for climbing or for operation at higher altitudes.

Referring to FIG. 1 there is shown a power loading ("y")-disc loading ("x") characteristic conventionally used in the field of helicopter design and showing operating points for helicopters using long rotating blades in accordance with current practice. These points assist in defining an operating region for current hovering craft which corresponds to a region in which power loading asymptotes and which may be described as the power loading or y asymptotic region "A". Intermediate this region and the disc loading or x asymptotic region, "B", lies an intermediate region "C" forming the design envelope for airborne hovering craft forming one aspect of this invention. The intermediate region "C" may also be defined, by way of more specific example, as an operating region in which an aerodynamic lifting device or airborne craft (referred to as a "Hoverpod" aircraft) has a band of disc loadings or weight per unit of lift area from 10 to 30 lb/sq ft as shown on the horizontal, or "X" axis, while also operating within the band of power loading or weight per unit horsepower from 3 to 13 lb/hp as shown on the vertical, or "Y", axis. This mix of characteristics is developed as a result of the radially compact design described with reference to FIG. 4. Such combination of characteristics allows for the lowest horsepower, the smallest size or the maximum useful payload or a desirable combination of any or all of these.

Figure 2:
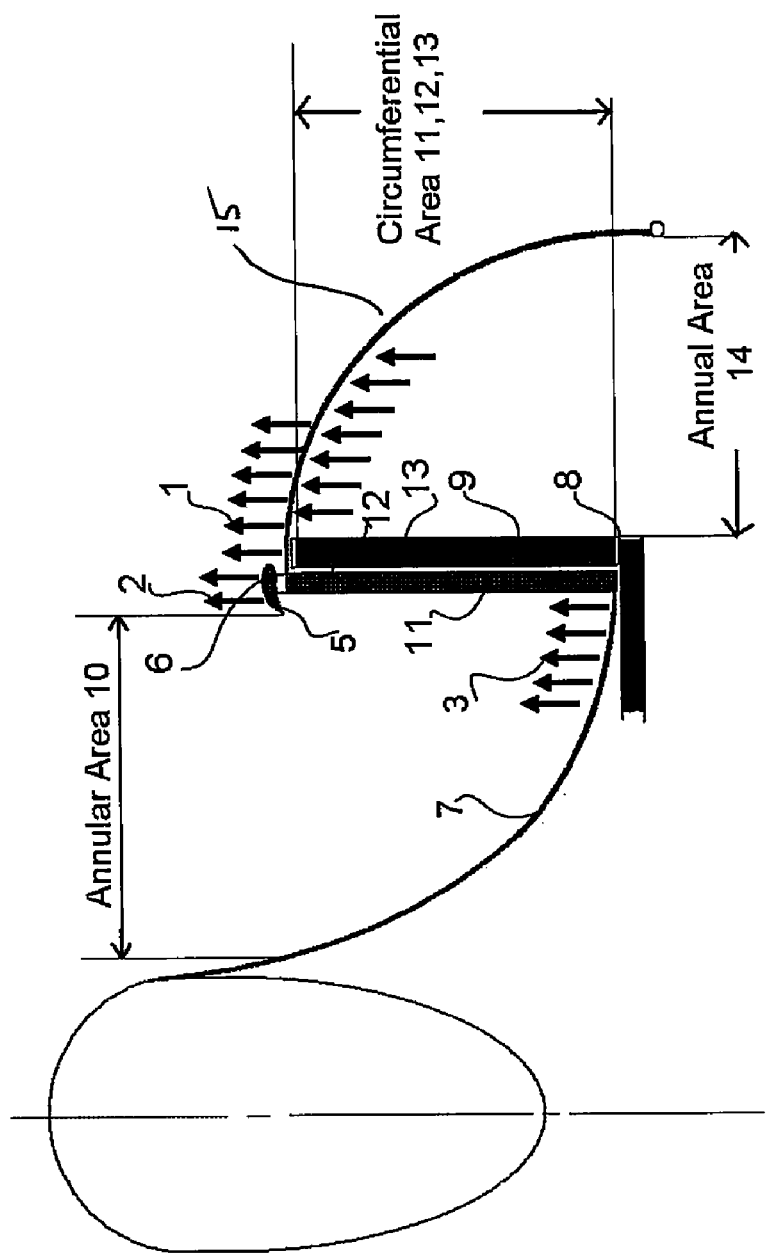
FIG. 2 is a diagrammatic half sectional view of an embodiment of the invention that indicates the primary lifting surfaces of the aerodynamic lifting device of the invention.

Referring to FIG. 2, there is shown a diagrammatic representation of the lifting device for an airborne hovering craft to operate within the design envelope or intermediate region "C" of the power loading—disc loading characteristic. Lift generated by the low pressure on the upper surfaces shown at 1, 2, and 3 may be optimized by optimizing the shape of these surfaces. The geometry of the lifting device may also be optimized, particularly in the region of surface 1 and area 14 (i.e. the annular area or outlet region at the exit of the shroud 15 which may be actuated to provide directional control of the lifting device). For example, an air foil shape may be adopted for surfaces 1 and 3. A flow guide, 6, which may be a separate annular ring with an aerodynamic cross section that may also function as a retainer and end plate for the stator blades is also desirably incorporated. Flow guide 6 may have a shape optimized to generate maximum lift through the development of the maximum pressure difference between its upper and lower surfaces. Flow guides similar to flow guide 6, placed above and attached to surface, 7, and to surface 8, which is part of the lower end plate of the rotor, 9 can also be provided. Optimum duct dimensions are selected, as desired, for the annular inlet area, 10, the vertical cylindrical areas, 11, 12 and 13, defined by the stator vane height at inlet, the rotor vane height at inlet, and the rotor vane height at exit respectively and the annular exit area, 14.

Figure 3:
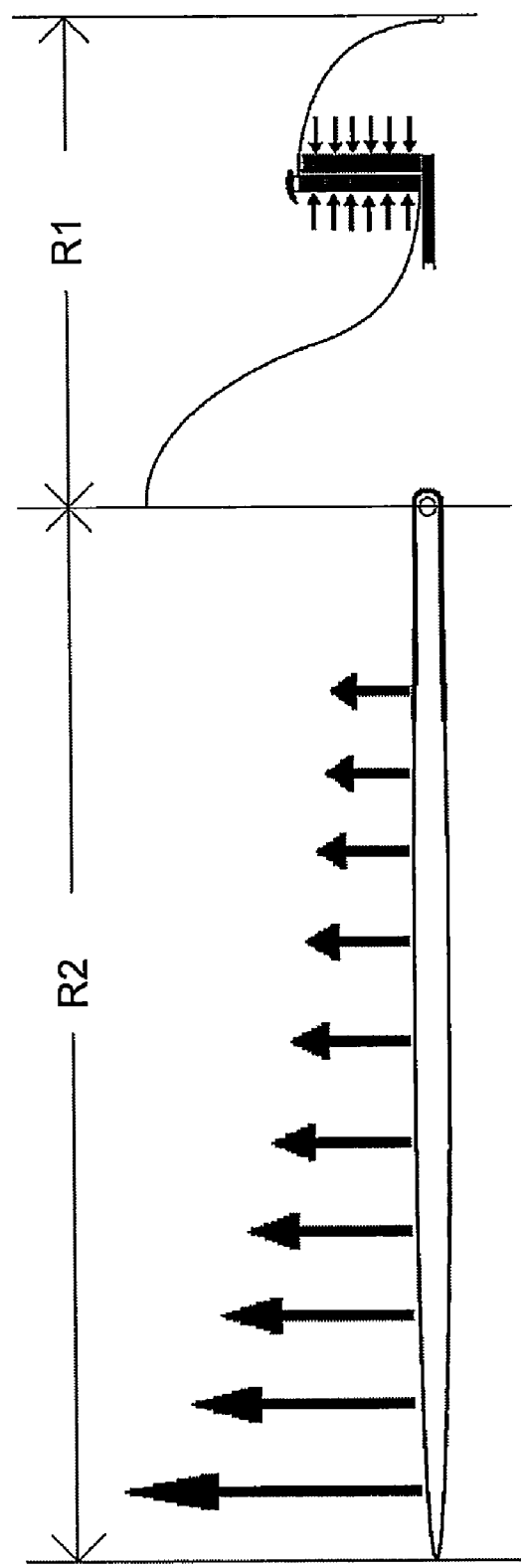
FIG. 3 is a diagrammatic half sectional view of the aerodynamic lifting device compared to a rotor blade lifting mechanism used by a helicopter scaled to demonstrate the size benefits of this invention.

Referring to FIG. 3, there is shown a diagrammatic representation of the lifting surfaces of FIG. 2, and the lifting surfaces of a helicopter rotor blade with comparable lifting capability. It can be seen that the radial dimension R1 for the aerodynamic lifting device of the invention is significantly less than the radial dimension R2, which is the radius of the rotor disk of the helicopter.

Figure 4:
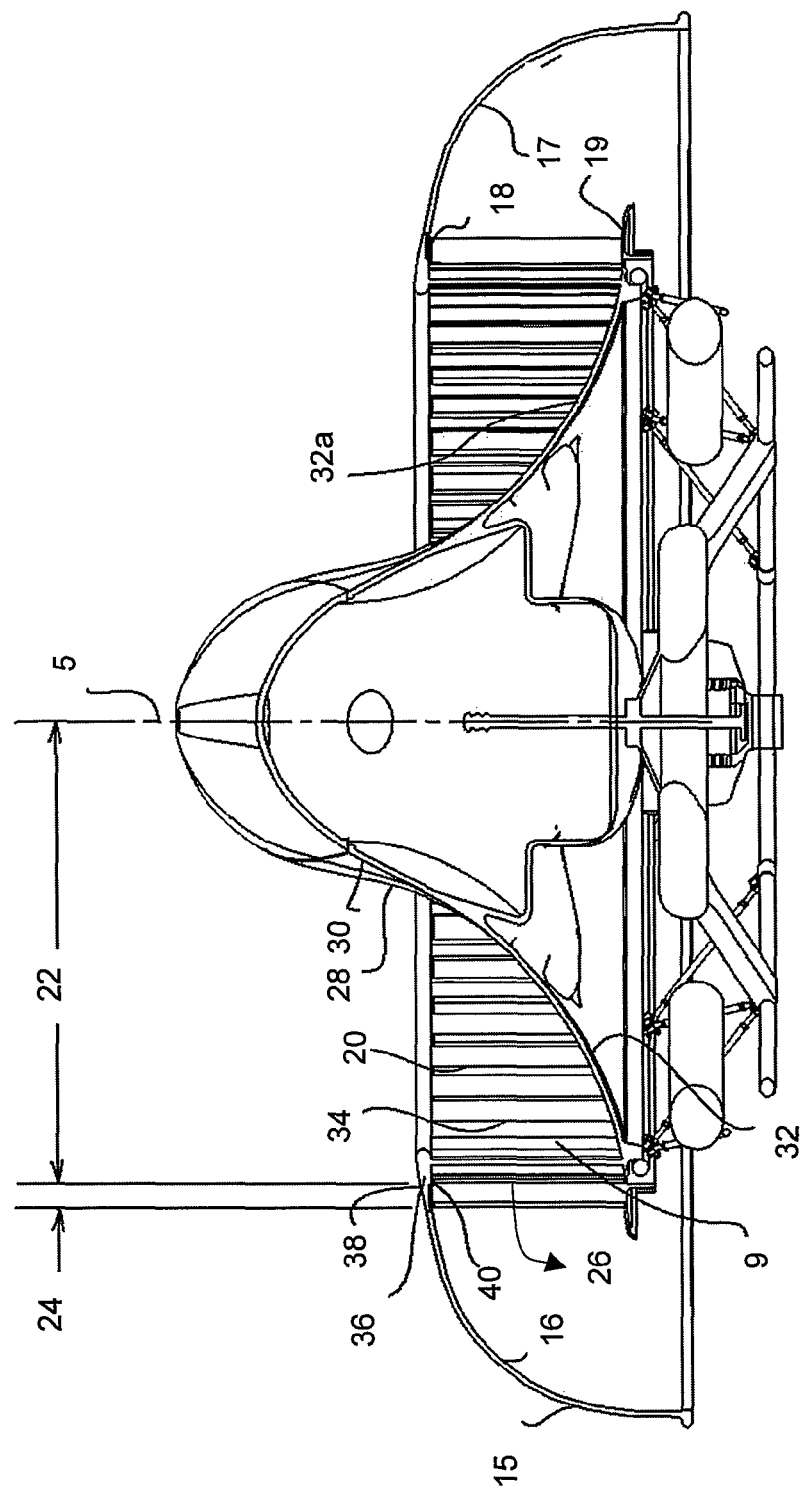
FIG. 4 is a sectional view of a preferred embodiment of the invention that indicates the primary lifting surfaces of the aerodynamic lifting device of the invention.

Referring to FIG. 4, there is shown a rotor in the form of a drum rotor or radial drum fan 9, with a plurality of vertically extending blades 20, arranged in an annulus disposed at a distance 22, from the fan thrust axis or direction 5, said blades occupying a region having a radial width 24, which is small relative to radial distance 22. The blades 20 extend downward and parallel to the fan axis 5. This construction thereby creates a useful load space inside the fan 9 and minimizes the mass of the fan 9 to provide the maximum useful load weight, and to avoid excessive gyroscopic and accelerating and decelerating forces on the rotor. This construction also allows the inlet area to the fan 9 to be maximized thereby minimizing the velocity that needs to be induced in the incoming air to generate the desired amount of lift.

Fan 9 generates a primarily radial airflow 26, in a directional orthogonal to the thrust axis 5, which does not impart any axial momentum to the air to generate lift through the rotor in contradistinction to the case with helicopters. Such construction allows the complete axial length of the rotor blades to be utilized to develop said velocity and therefore to develop maximum pressure beyond the fan exit. This means that maximum use is made of the fan blade length and mass in contrast to the inefficient use made of conventional helicopter blades of the prior art.

A stator assembly 28, comprises an inner load carrying hub 30, with lifting surfaces 32 and 32a, a plurality of stator blades 34, and an upper stator blade retaining ring 36, with upper and lower lifting surfaces 38 and 40, and an outer shroud 15, that incorporates upper (i.e. outer) and lower (i.e. inner) lifting surfaces 16 and 17. The stator blades 34 of the stator assembly 28 provides an equal and opposite torque to the rotor. Similarly to the rotor blades 20, the stator blades occupy an annular region having a radial width which is mall relative to the radial distance at which the stator blades are disposed.

Fan blades 20 have a uniform section, and may be retained by an upper rotor blade retaining ring, 18, and a lower rotor blade retaining ring, 19. Rings 18 and 19 form a diffuser duct, in conjunction with shroud 15, for the purposes of generating the maximum pressure over the lifting surface 17.

Lower blade retaining ring 19 has an outer friction or drive face that can be driven by the back of a toothed belt, a flat belt, or other drive means.

Figure 5:
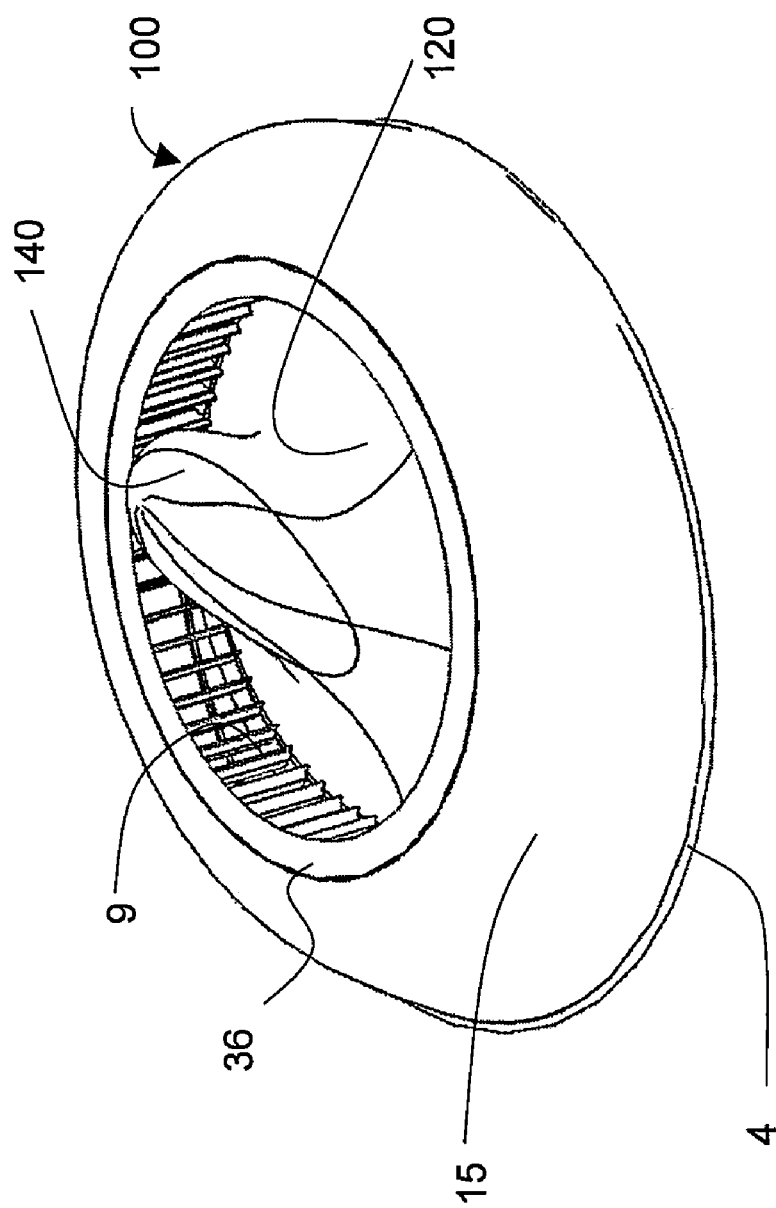
FIG. 5 is a schematic drawing of a preferred embodiment of this invention.

Referring to FIG. 5 there is shown an airborne craft 100 of a preferred embodiment of the invention, which can be used in a wide variety of applications. FIG. 5 indicates the use of a shape for the central load carrying space 120 that provides a cockpit operating area 140 for an operator while maximizing the area available for airflow into the fan 9. In particular, the horizontal annular area defined by the cockpit 140 and the upper annular retaining ring for the stator 36 (annular area 10 in FIG. 2) that could control the air entry to the fan is held to the maximum and the volume available for the operator is allowed to grow vertically and radially above this plane to provide more load space without compromising airflow into the fan. The flexible shroud 15 is shown in a forward deflected position as may be used to effect a braking or reversing maneuver.

Figure 6:
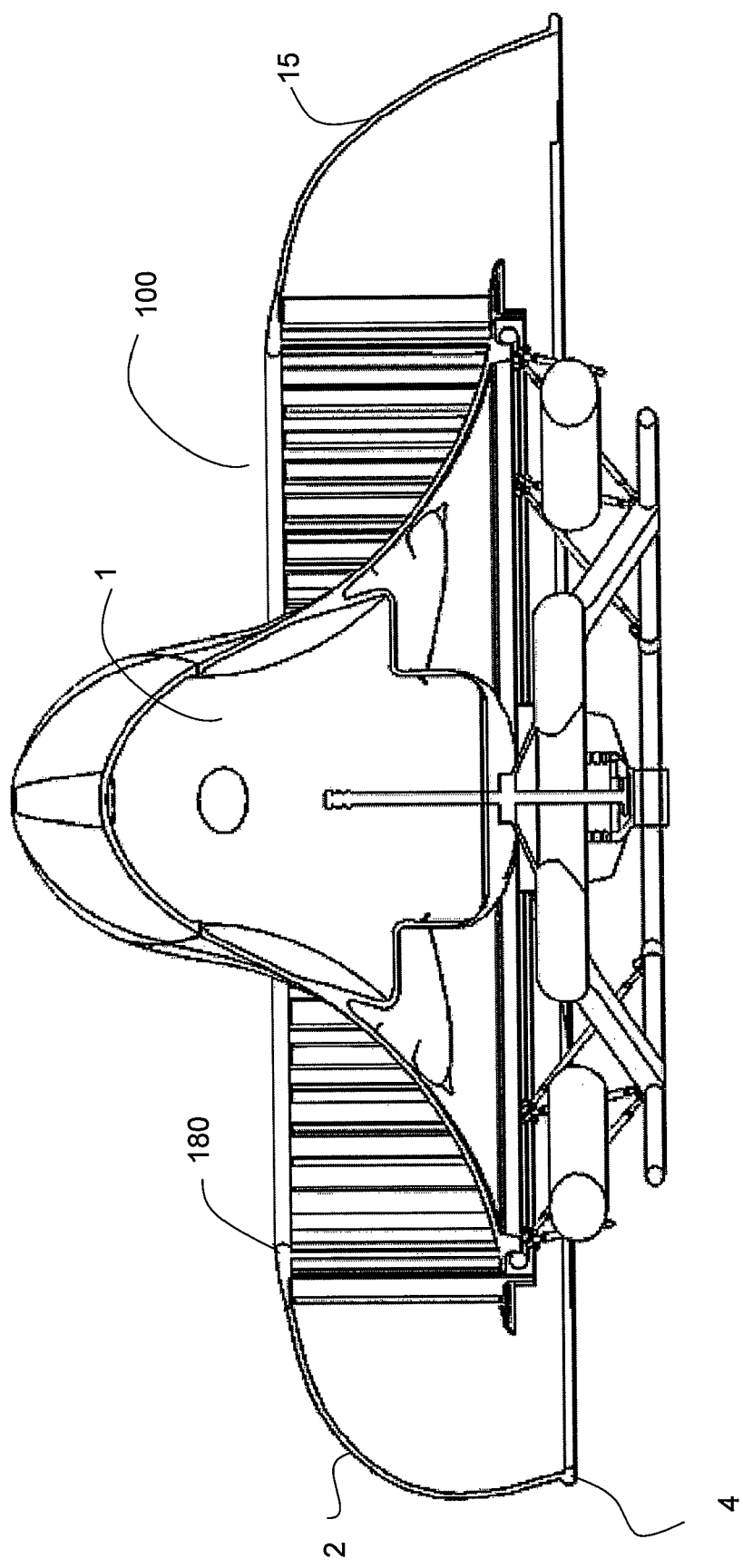
FIG. 6 is a similar sectional view of said preferred embodiment that shows the flexible shroud or thrust vector in an offset position with the lower rigid ring displaced to effect a change in direction.
Figure 7:
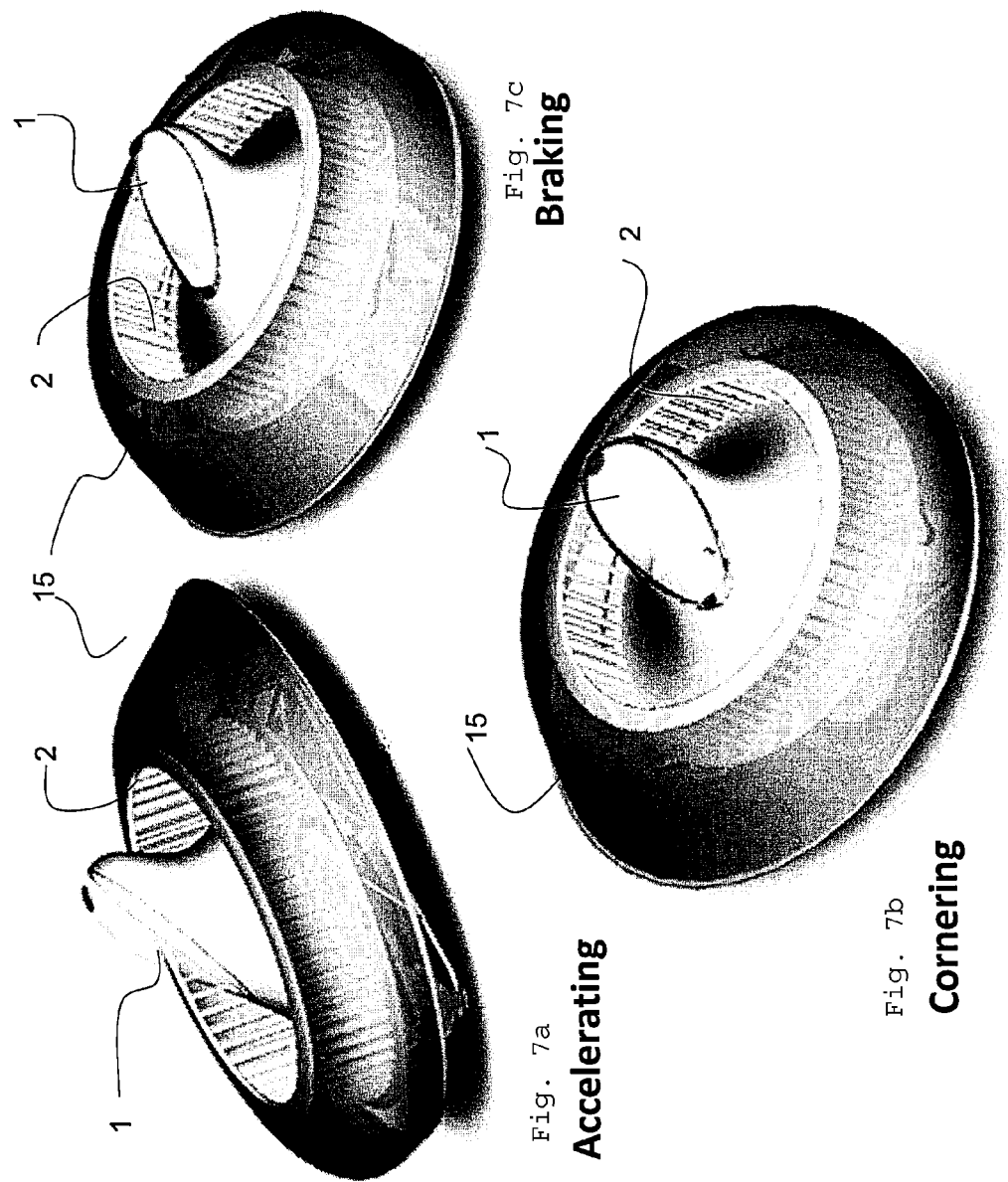
FIG. 7a provides an image of the flexible shroud thrust vector in accelerating position.
FIG. 7b provides an image of the flexible shroud thrust vector in cornering position.
FIG. 7c provides an image of the flexible shroud thrust vector in braking position.

Referring to FIG. 6, there is shown an outer shroud 15, having orthotropic characteristics, for airborne craft 100 which incorporates an inner edge 180 that is fixed to a grill and/or vane sub assembly attached to the stator blade retaining ring 36; the outer shroud 15 forming a relatively flexible flow guide; and having a relatively rigid outer rim, 4, and means (not shown) for connecting said rigid outer rim to a means for an operator to control the position of the said outer rim relative to the said fixed inner edge such that the flow guide and outer rim create a smooth surface that vectors the airflow in a desirable way to assist with maneuvering of the airborne craft 100.

Referring to Figs, 7a-7b, there is shown a preferred embodiment of airborne craft 100 that shows the flexible shroud 15 in three positions, as achieved by control of airflow so as to cause the airborne craft 100 to accelerate forward, brake or reverse backward, or move laterally as would be required to go around a corner. The flexible shroud is constructed predominately of a rip-stop nylon material. Other, more flexible material, can be used as an alternative, or in conjunction with, the rip-stop to provide the necessary degree of maneuverability of the shroud so as to allow movement of the shroud for the purposes of thrust vectoring whilst retaining the ability of the shroud to efficiently re-direct the airflow from the drum rotor fan in a downward direction.

Figure 8:
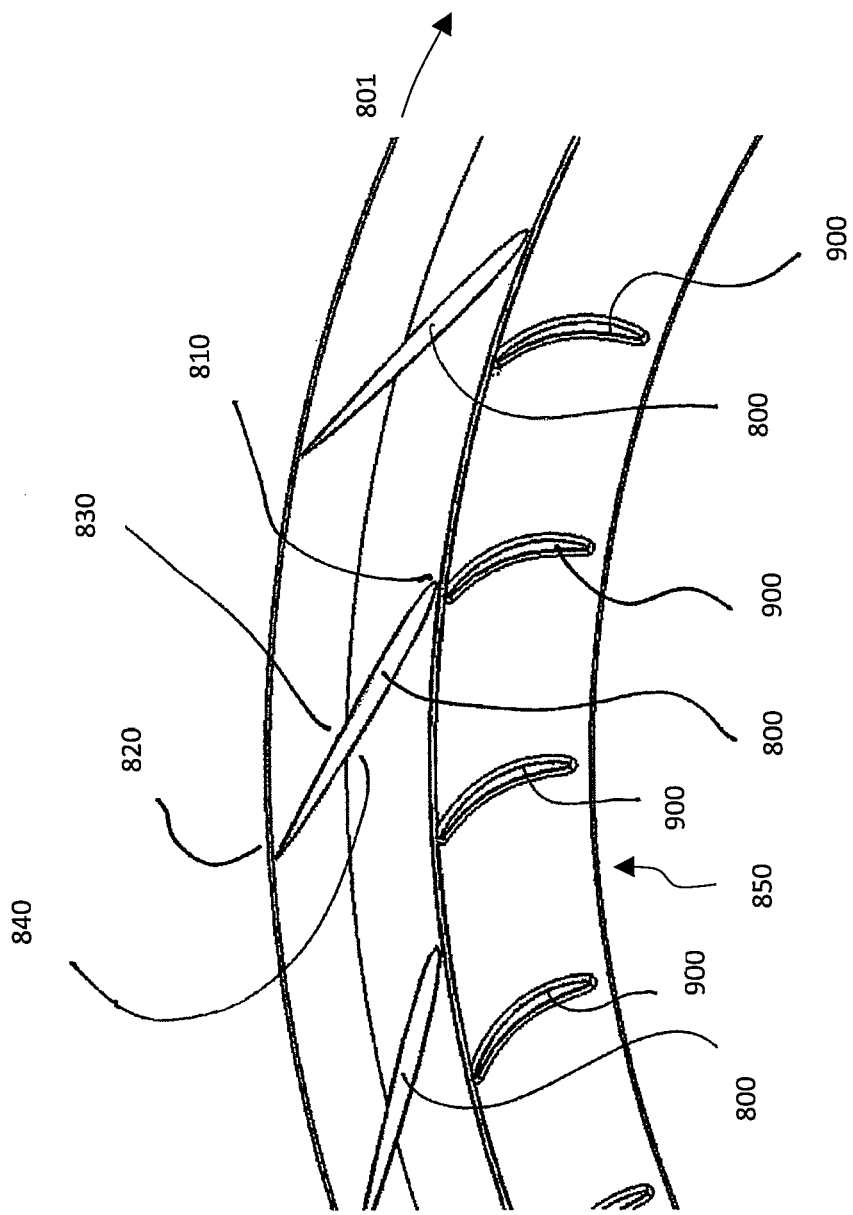
FIG. 8 is a sectional view showing the disposition and geometry of the rotor blades and inlet stator blades for a radial drum fan employed in preferred embodiments of aerodynamic lifting device and airborne craft of the present invention such as shown in FIGS. 4 to 7.

Referring to FIG. 8, there is shown a preferred embodiment of the geometry of the rotor blades 800 and stator blades 900. The rotor blades 800 are attached to upper and lower annular retaining rings (not shown) and rotate in the direction indicated by arrow 801. The rotor blades 800 are in the form of a aerodynamic wing profiles in the NACA series of profiles and have a leading edge 810 with a defined radius, a trailing edge 820 the thickness of which is less than the leading edge, a forward face 830, and a back face 840. Air flows from the radially inner side of the rotor blades 850 and is accelerated by the stator blades 900 in the circumferential direction towards the oncoming leading edges 810 of the rotor blades 800. The geometry of the rotor blades 800 creates an aerodynamic force on the rotor blades which is in opposition (ie radially inward) to the centrifugal forces acting on the rotor blades as a result of their rotation about the rotor axis in use.

Figure 9:
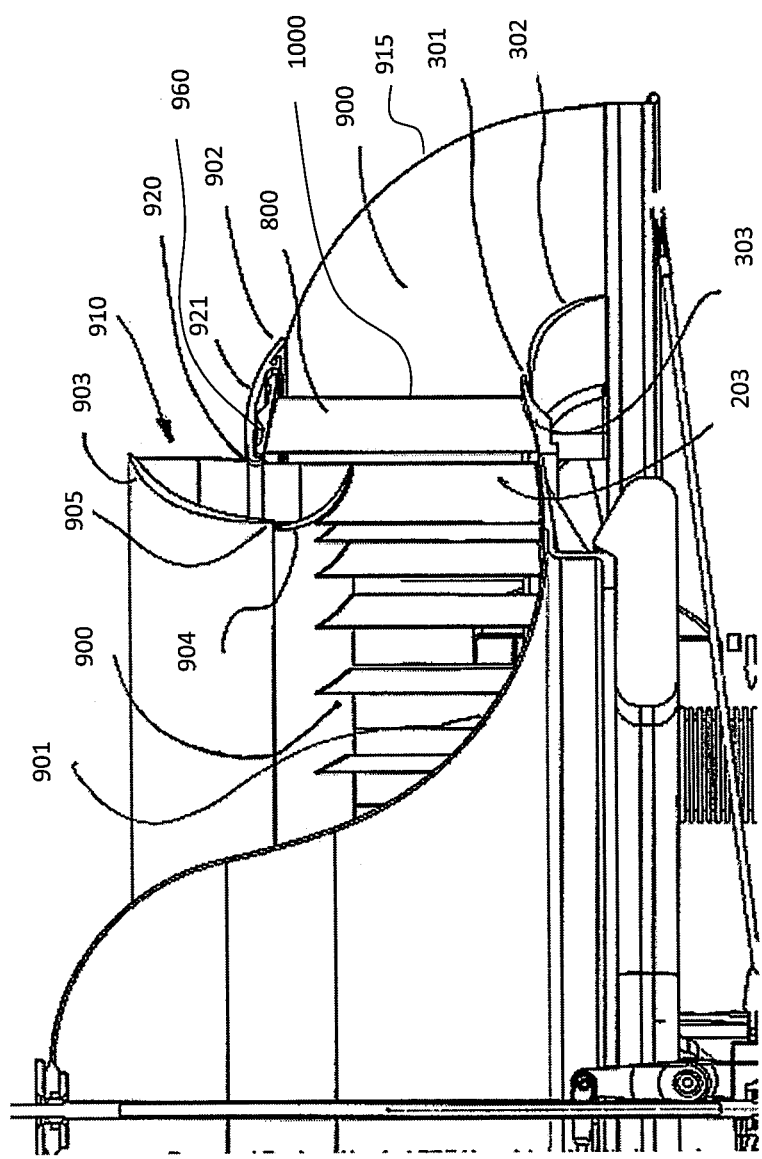
FIG. 9 is a sectional view showing the use of an upper inlet duct and an outlet duct and associated wings and slots in a second embodiment of aerodynamic lifting device and airborne craft of the present invention having a diameter of approximately 600 mm and adapted for unmanned operation.

Referring to FIG. 9, there is shown a rotor 1000, a stator 900, the stator having an inner hub 901 and an outer hub 902. Stator blades 903 are provided at the radially outermost part of the inner hub. An upper inlet duct 910 is defined in part by an annular lip 920. The lip 920 forms part of the outer hub 902 of the stator and houses the top of the rotor 1000. Lip 920 extends over and radially beyond the upstream facing edge of rotor blade 800 (see also FIG. 10 for more detail). The lip 920 is surrounded by and forms part of an airfoil 921 which is contoured to provide positive lift when air flows over the airfoil 921 and passes into the upper inlet duct 910. It may also be seen that lip 920 overlaps upper retaining ring 960 for rotor drum 1000, this allowing a smooth transition of the airflow into the rotor 1000 (see also FIG. 10 for detail). The upper inlet duct also comprises a set of wings 903, 904 separated by a slot 905.

Figure 10:
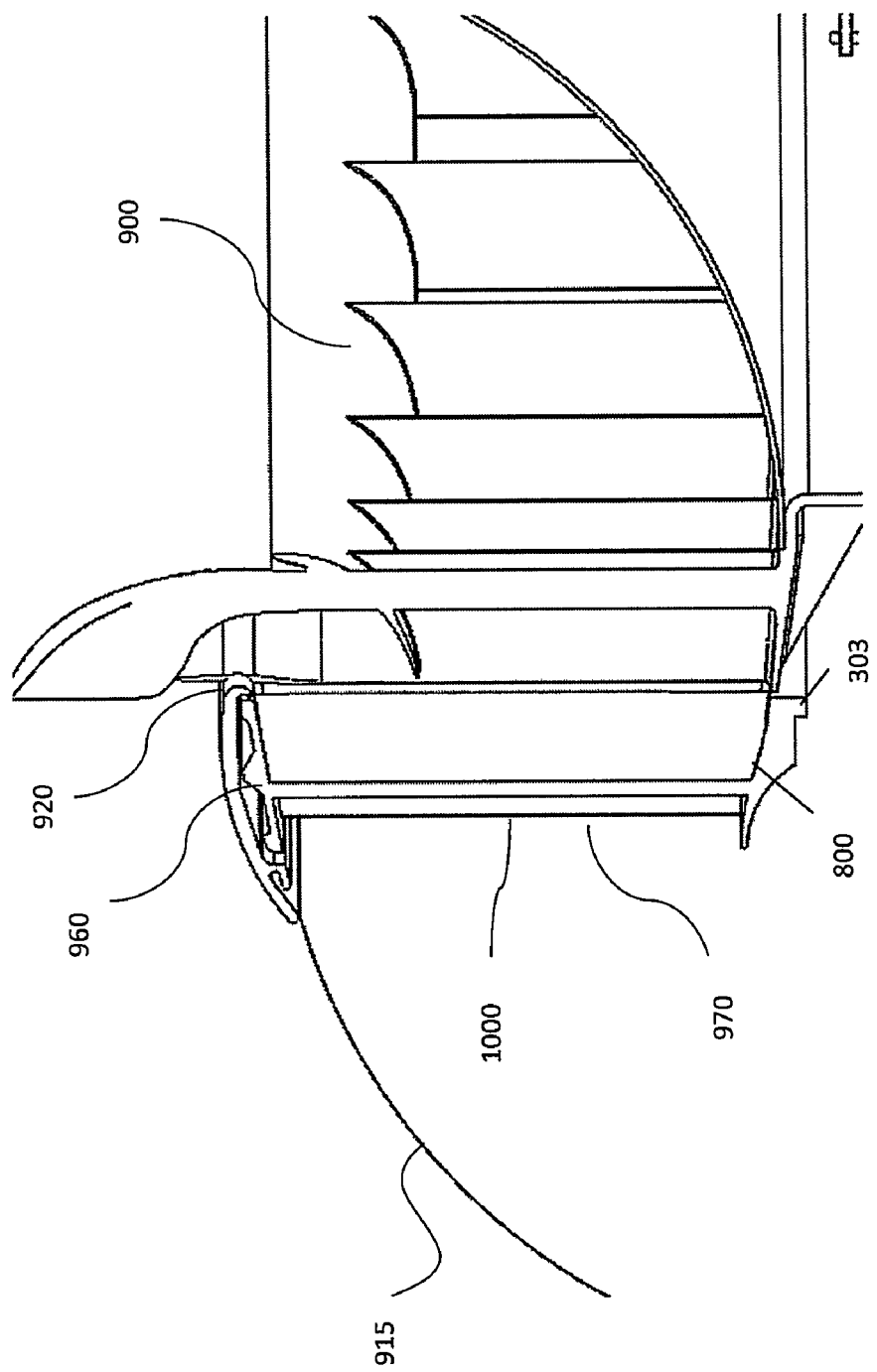
FIG. 10 is a detail of FIG. 9 showing the diffuser duct configuration.

FIG. 9 also shows an outlet duct which contains a wing 301 having a slot 302 between it and the lower retaining ring 303 of the rotor drum 1000. The facing surfaces of the retaining rings 960 and 303 may converge towards the radially outer side of the rings 960 and 303 to form a diffuser duct 970 (as best seen in FIG. 10)—which acts in conjunction with shroud 915 to assist airflow through the diffuser duct 970 to generate maximum pressure over the lower lifting face 916 of the shroud 915 to generate lift. The diffuser duct 970 geometry is also observable from the lesser length of rotor blade 800 on its radially outward side in comparison to its length on the radially inward side of the blade 800. This is shown in detail in FIG. 10.

Figure 11:
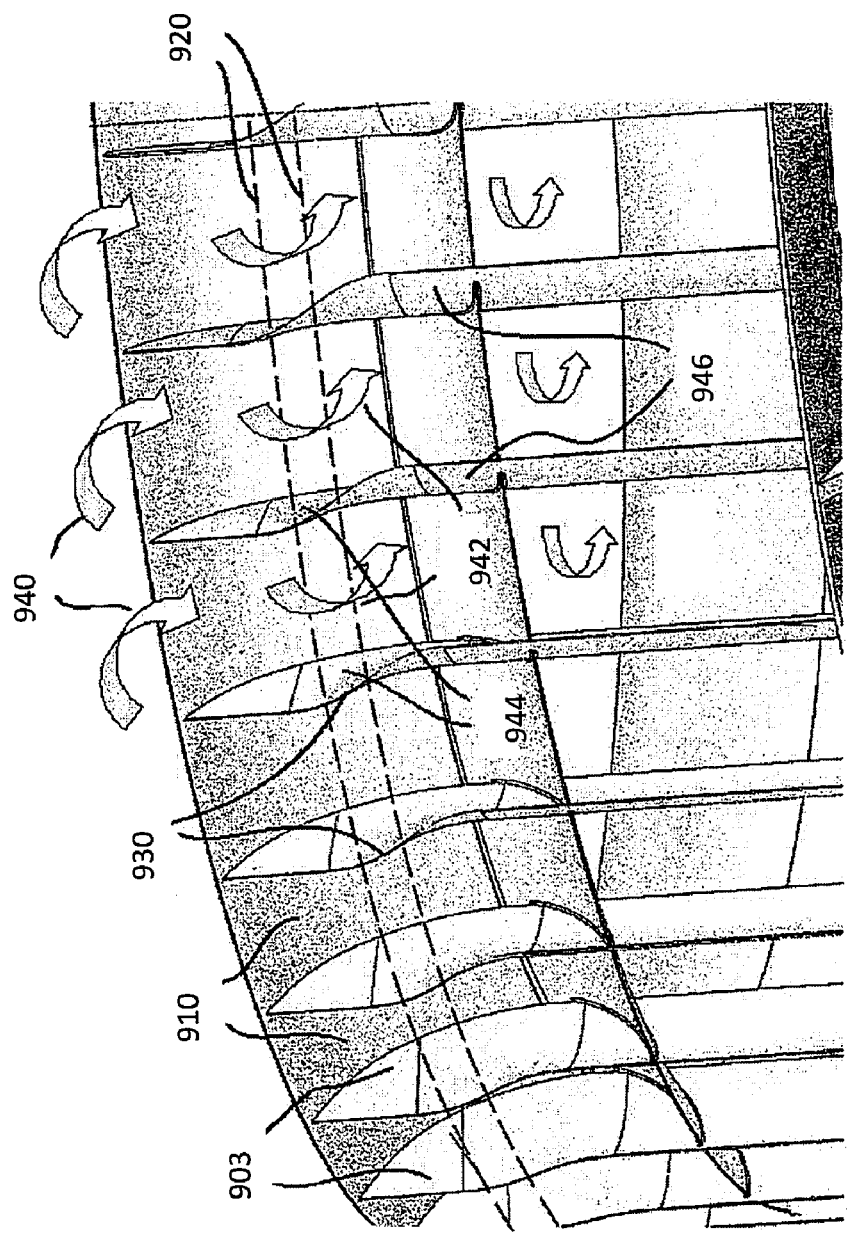
FIG. 11 shows a partial isometric view of the inlet stator blades of the aerodynamic lifting device shown in FIG. 9.

Referring to FIG. 11, there are shown inlet stator blades 903, an upper inlet duct 910 and an edge 930 which contacts the upper lip 920 (not shown) in the region between the two dotted lines representing the upper lip.

FIG. 11 also shows an airstream 940 entering the upper inlet duct 910 in a radial direction and a subsequent airstream 942 deflected in a partially tangential direction by the twisted surface of the upper part of the stator blades 944 and the camber of the lower part of the stator blades 946.

Figure 12:
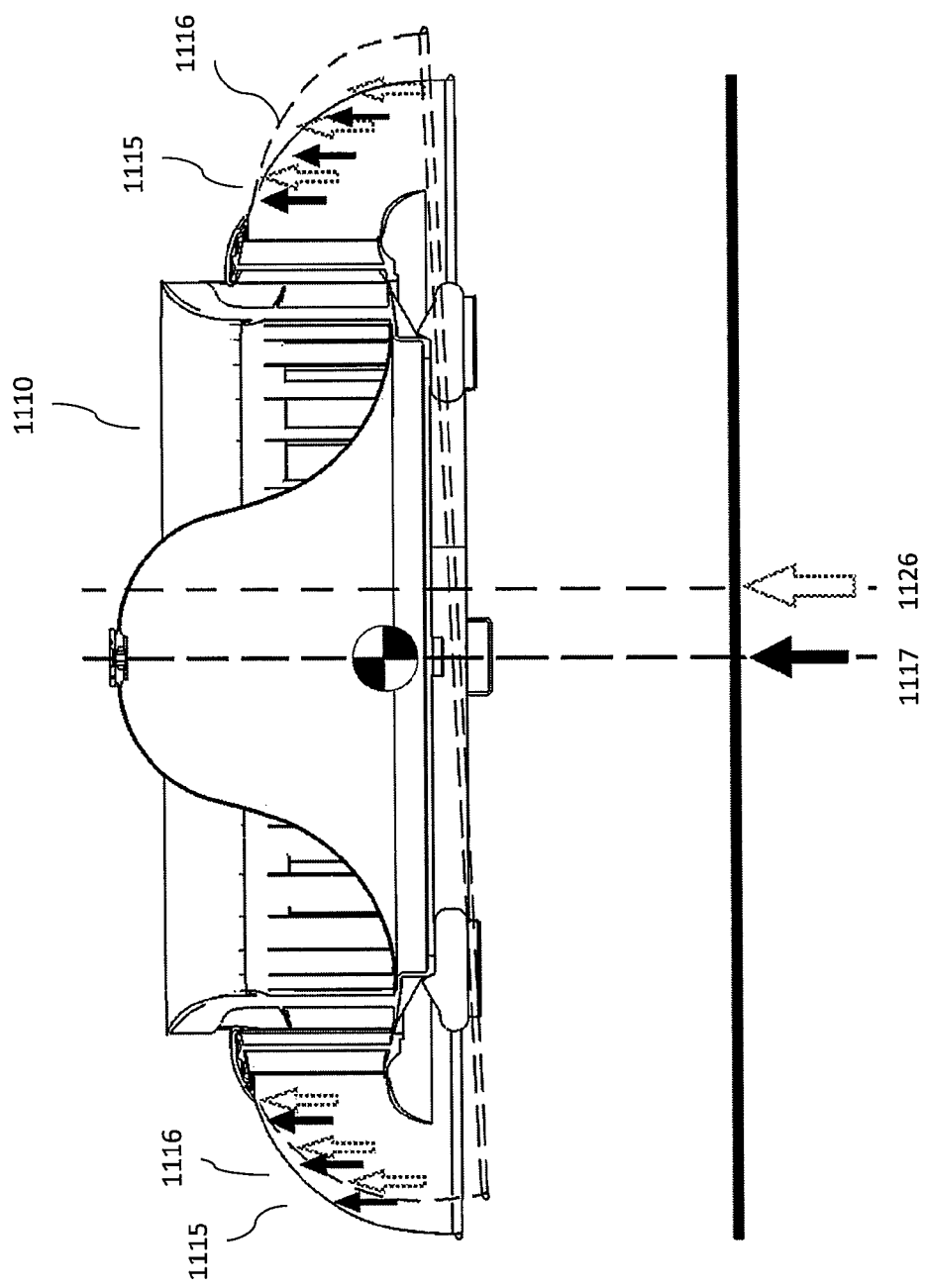
FIG. 12 is a sectional view of the airborne craft shown in FIG. 9 showing two alternative positions of the shroud.

Referring to FIG. 12, there is shown a neutral position of the shroud 1115 and an actuated deflected position 1116 (in dotted lining) for an airborne craft 1110. A resultant force 1117 acts through the centre of gravity 1118 when shroud 1115 is in the neutral position. Actuation of the shroud 1115 to the deflected position 1116 results in a change in the position of the centre of action of the lifting forces to 1120 due to movement in location of the resultant force to 1126. This results in a torque being produced about the centre of gravity and the craft rotating in this direction. The resulting tilt of the craft thus vectors the thrust such as to propel the craft laterally. Once the desired level of tilt has been achieved, the shroud 1115 is actuated to maintain the desired level of tilt.

Modifications and variations of the aerodynamic or airborne lifting device and airborne craft of the invention may be apparent to skilled readers of this disclosure. Such modifications and variations are deemed within the scope of the present invention.

What is claimed is:

1. An airborne lifting device comprising:
    a fan having a vertical axis and a plurality of blades adapted to generate primarily radial airflow, said plurality of blades having axes that are also vertical or near vertical disposed at a distance from said fan axis, wherein each of said plurality of blades possesses a radial depth which is smaller than said distance;
    a stator assembly that comprises an inner load carrying hub and lifting surfaces; and
    wherein said lifting device further comprises a flexible outer shroud incorporating upper and lower aerodynamic lifting surfaces as thrust vectoring means, said flexible outer shroud including shroud constraints adapted to selectively change the shape of said flexible outer shroud to provide directional control of said lifting device.

2. The lifting device of claim 1 wherein said fan has an input airflow side and wings to generate lift are mounted on said input airflow side.

3. The lifting device of claim 1 wherein said blades are contoured so that the aerodynamic lifting forces acting on the blades are approximately opposite in magnitude and direction to centrifugal forces acting on the blades in use.

4. The lifting device of claim 3 wherein upper face(s) of the inner and outer hub or stator of the fan which are disposed near the inlet or low pressure side of the fan are contoured to function as wing(s).

5. The lifting device of claim 4 wherein the wing(s) function as a flow deflector to improve the radial flow into the stator and stator assembly.

6. The lifting device of claim 5 wherein the wings function as an upper restraint for the stator blades.

7. The lifting device of claim 2 wherein the input airflow side of said fan includes an upper inlet duct comprising one or more annular wings or guide vanes.

8. The lifting device of claim 2 wherein the input airflow side of said fan includes an upper inlet duct which is at least partially defined by a lip which is disposed around the most radially inward upstream circumference of the fan.

9. The lifting device of claim 8 wherein said lip forms part of the annular airfoil which functions as an upper restraint for the stator blades.

10. The lifting device of claim 7 wherein at least part of said wings or guide vanes are disposed in an inlet region containing radially directed airflow.

11. The lifting device of claim 1 wherein said fan includes an outlet duct comprising one or more annular wings or vanes.

12. The lifting device of claim 11 wherein said outlet duct is at least partially defined by a lip which is disposed around the most radially outward, downstream circumference of the rotor of the drum fan.

13. The lifting device of claim 8 wherein stator blades are located in the upper inlet duct and are contoured to provide approximately the same degree of circumferential acceleration to the airflow at the inlet to the rotor blades as that provided by the stator blades which are disposed below the upper inlet duct.

14. The lifting device of claim 8 wherein, in at least one of said inlet duct and an outlet duct, the corresponding lip is contoured to develop lift.

15. The lifting device of claim 8 wherein, in said inlet duct, the lip extends over and radially beyond the inner edge of the rotor blades.

16. The lifting device of claim 8 wherein, in said inlet duct, the corresponding lip has wings to generate lift disposed about it, both upstream and downstream and radially inward of said lip.

17. The lifting device of claim 4 wherein the wings form an aerodynamic slot by being spatially disposed to each other and/or the associated lip.

18. The lifting device of claim 12 wherein said lip is contoured to develop lift.

19. The lifting device of claim 12 wherein said lip extends over and radially beyond the inner edge of the rotor blades.

20. The lifting device of claim 12 wherein said lip has wings to generate lift disposed about it, both upstream and downstream and radially inward of said lip.

21. The lifting device of claim 1 wherein said stator assembly further comprises stator blades that are radially inward of and parallel to said plurality of fan blades.

22. The lifting device of claim 1 wherein said inner load bearing hub bears a load comprising operator and operator controls for said lifting device.

23. The lifting device of claim 22 wherein said stator blades protect said operator from said fan blades.

24. An airborne lifting device comprising:
a fan having a vertical axis and a plurality of fan blades having vertical or near vertical axes disposed at a distance from said fan axis, each said fan blade having a radial depth which is small relative to said distance of each said fan blade from said fan axis and generating primarily radial airflow;
a stator assembly comprising an inner load carrying hub and lifting surfaces;
wherein said lifting device comprises a thrust vectoring means including constraints adapted to selectively change the configuration of said thrust vectoring means to provide directional control of said lifting device; and
wherein said inner load bearing hub bears a load comprising operator and operator controls for said lifting device.

25. The lifting device of claim 24 wherein said stator assembly further comprises stator blades provided radially inward of and parallel to said fan blades.

26. The lifting device of claim 25 wherein said stator blades protect said operator from said fan blades.

27. The lifting device of claim 24 wherein said thrust vectoring means is a flexible outer shroud comprising upper and lower aerodynamic lifting surfaces and wherein said constraints provide directional control of said lifting device by selectively changing the shape of said flexible shroud.

28. The lifting device of claim 25 wherein said fan has an input airflow side including an upper inlet duct in which said stator blades are located, said stator blades being contoured to provide approximately the same degree of circumferential acceleration to the airflow at the inlet to the rotor blades as that provided by the stator blades which are disposed below the upper inlet duct.

29. The lifting device of claim 26 wherein said fan has an input airflow side including an upper inlet duct in which said stator blades are located, said stator blades being contoured to provide approximately the same degree of circumferential acceleration to the airflow at the inlet to the rotor blades as that provided by the stator blades which are disposed below the upper inlet duct.

30. The lifting device of claim 27 wherein said fan has an input airflow side including an upper inlet duct in which said stator blades are located, said stator blades being contoured to provide approximately the same degree of circumferential acceleration to the airflow at the inlet to the rotor blades as that provided by the stator blades which are disposed below the upper inlet duct.

31. The lifting device of claim 24 wherein said fan blades are contoured so that the aerodynamic lifting forces acting on the blades are approximately opposite in magnitude and direction to centrifugal forces acting on the blades in use.

* * * * *